United States Patent
Costa et al.

(10) Patent No.: US 7,693,098 B2
(45) Date of Patent: Apr. 6, 2010

(54) METHOD FOR CONTROLLING PAGING SIGNALING COMMUNICATION WITH MOBILE STATIONS WITHIN A WLAN NETWORK

(75) Inventors: Xavier Perez Costa, Heidelberg (DE); Marco Liebsch, Heidelberg (DE)

(73) Assignee: NEC Corporation, Tokyo (JP)

( * ) Notice: Subject to any disclaimer, the term of this patent is extended or adjusted under 35 U.S.C. 154(b) by 852 days.

(21) Appl. No.: 11/488,681

(22) Filed: Jul. 19, 2006

(65) Prior Publication Data

US 2007/0036097 A1 Feb. 15, 2007

(30) Foreign Application Priority Data

Aug. 12, 2005 (DE) ........................ 10 2005 038 548

(51) Int. Cl.
H04B 7/185 (2006.01)
(52) U.S. Cl. ..................... 370/318; 370/328; 370/311; 370/338; 455/522
(58) Field of Classification Search ................. 455/458, 455/500, 502, 522, 517, 69; 370/346, 349, 370/310, 311, 312, 318, 328, 338
See application file for complete search history.

(56) References Cited

U.S. PATENT DOCUMENTS

| | | | |
|---|---|---|---|
| 2002/0046287 A1 | 4/2002 | La Porta et al. | |
| 2003/0145092 A1* | 7/2003 | Funato et al. | 709/229 |
| 2005/0037781 A1* | 2/2005 | Ozugur et al. | 455/458 |
| 2005/0232200 A1* | 10/2005 | Jeong et al. | 370/331 |
| 2006/0088019 A1* | 4/2006 | Liebsch | 370/338 |

FOREIGN PATENT DOCUMENTS

| | | |
|---|---|---|
| DE | 10 2004 052 331 A1 | 5/2006 |
| EP | 1 519 515 | 3/2005 |
| EP | 1 290 906 | 7/2005 |
| JP | 2002-541731 | 12/2002 |
| JP | 2005-516509 | 6/2005 |

OTHER PUBLICATIONS

IEEE: ANSI/IEEE Std 802.11, 1999 Edition (R2003), Information technology—Telecommunications and information exchange between systems—Local and metropolitan area networks—Specific requirements, Part 11: Wireless LAN Medium Access Control (MAC) and Physical Layer (PHY) Specifications, IEEE 2003, Seiten i-xiv, 1-14, 123-137.
M. Liebsch, X. Perez-Costa, "Utilization of the IEEE802.11 Power Save Mode with IP Paging," In Proceedings of IEEE International Conference on Communications (ICC), Seoul, Korea, May 2005.
Marco Liebsch et al., Utilization of the IEEE 802.11 Power Save Mode with IP Paging, In Proceedings of IEEE International Conference on Communications s(ICC), May 2005, pp. 1383-1389.
Part 11: Wireless LAN Medium Access Control (MAC) and Physical Layer (PHY) specifications, IEEE Std 802.11—1997, Jun. 1997, pp. 128-132.

* cited by examiner

*Primary Examiner*—Kamran Afshar
(74) *Attorney, Agent, or Firm*—Young & Thompson

(57) ABSTRACT

A method for controlling the communication with mobile stations in a network, preferably in a WLAN (Wireless Local Area Network) according to the IEEE 802.11 standard, wherein the network comprises access points through which the mobile stations are associated with the network and wherein the mobile stations can be set to power save mode is—with respect to an especially energy-efficient operation of the mobile station-designed in such a way that paging signaling is performed in order to locate a mobile station.

21 Claims, 3 Drawing Sheets

METHOD FOR CONTROLLING PAGING SIGNALING COMMUNICATION WITH MOBILE STATIONS WITHIN A WLAN NETWORK

BACKGROUND OF THE INVENTION

1. Field of the Invention

The present invention relates to a method for controlling the communication with mobile stations in a network, preferably in a WLAN (Wireless Local Area Network) according to the IEEE 802.11 standard, wherein the network comprises access points, over which the mobile stations are associated with the network, and wherein the mobile stations can be set to power save mode.

2. Description of the Related Art

Many mobile stations have in most cases wireless access to a network, with which they can, for example, access the Internet or e-mailboxes. The IEEE 802.11 standard represents a widely accepted access technology to wireless local networks (Wireless Local Area Networks, WLANs) and is more and more commonly used in private contexts and hotspots in order to access the internet. In case of mobile stations that are mostly run by power supplies that are independent from the electricity network, as for example by batteries, accumulators, or fuel cells, a utilization of the limited energy available as efficient as possible is particularly important. It is hence requested to de-activate individual functions of the mobile stations whenever they are not needed. Whenever needed, the availability of the functions should not be hampered though. Accordingly, also in case of wireless network accesses the activity of the sending and receiving function of the mobile station can always be reduced, when no IP packets are received or sent by the mobile station for a longer time. At the same time, it has to be ensured that also in power save mode possibly incoming packets can be received.

For this end, the IEEE 802.11 specification shows the basic mechanisms to support the network interface card (NIC) of mobile stations after having entered the power save mode (PSM). Furthermore, the IEEE 802.11 standard allows for a signaling of existent data traffic, as well as for forwarding of IP packets arriving at IEEE 802.11 access points (AP) to mobile stations that have entered PSM. The correspondingly relevant configurations are performed during an association process between the mobile device and an access point. Here, the mobile device gives information to the access point about parameters concerning its listen interval (LI), and in exchange the access point assigns the mobile device an association identifier (AID). The whole control of a mobile station in PSM is hence with the access point, i.e. the access point administers the state of the mobile station, buffers IP packets destined for the mobile station in power save mode, and informs the mobile station by a so-called traffic indication map (TIM) when packets have arrived that can be polled, i.e. collected, from the access point. Finally, the access point forwards the buffered data packets to the corresponding station, when the station retrieves the packets by an IEEE 802.11—specific signaling message (a so-called power save poll, PSP) packetwise.

For communication between a mobile station and an access point the AID acquired during the association process is used. In this context, it is problematic that the AID is only valid as long as the mobile remains associated with this particular access point. If the mobile station moves, a change of the coverage areas of individual access points is rather unavoidable. Consequently, as soon as the mobile station changes into the coverage area of another access point, a new association has to be performed and a new AID has to be requested. If a mobile station is in PSM, it has to leave the PSM in order to newly associate, and can re-enter PSM only afterwards. This leads to unnecessarily high power consumption, as compared to when the mobile station could stay in PSM due to a reduced activity. (See M. Liebsch, X. Perez-Costa, "Utilization of the IEEE802.11 Power Save Mode with IP Paging," In Proceedings of IEEE International Conference on Communications (ICC), Seoul, Korea, May 2005.)

SUMMARY OF THE INVENTION

Hence, the present invention is based on the task to design and further develop a method for controlling the communication with mobile stations in a network of the above-mentioned kind in such a way that in case of a change of the coverage area from one access point to that of another one, the mobile station in PSM needs the least activity and signaling possible, that a completely new association is possibly avoided and hence the power consumption of the mobile station is further reduced.

According to the invention, the task mentioned above is solved by a method showing the characteristics of patent claim 1. According to this, such a network is characterized in that signaling of paging is performed in order to locate a mobile station.

According to the invention, it has first been recognized that a continuous new association is only necessary, because in a network, in particular according to IEEE 802.11 specification, the coverage area of the access point in which a mobile station is currently located has to be always known.

According to the invention it has further been recognized that many new associations, signaling procedures and the consequent leaving of the PSM can be avoided by switching to other options for localization. Particularly efficient is the utilization of paging signaling, with which a mobile station can be located within a paging area. Paging means the principle of broadcasting mostly in a radio network. Such a paging signaling can be integrated into the existing IEEE 802.11 specification and can be utilized to find mobile stations. In an advantageous way a paging signaling can be realized by using mechanisms that are available as standard in the IEEE 802.11 specification.

In a particularly preferred embodiment of the invention, the PSM as known from the IEEE 802.11 standard is amended by a dormant state which is not only valid in the coverage area of an access point, but within the whole paging area and where the identification of the mobile station in PSM does not depend on a new association. Only when the access point sends a paging signaling to a mobile station, this mobile station is made to leave the dormant state. Between entering the dormant state and leaving the dormant state, the coverage areas of several access points can be entered and left again without leaving the dormant state.

In order to secure the identification of a mobile station in the whole paging area, an unambiguous paging identification (PID) is generated and transmitted to the corresponding mobile station. By such means, the mobile station can be unambiguously identified and localized within the paging area. In paging areas with a huge multitude of mobile stations, PIDs may possibly happen to be not available in the needed number. In such a case, the same PID could be assigned to several mobile stations, and in order to unambiguously identify one mobile station, further identifiers, for example, the IP address or the MAC address could be referred to.

Preferably, the PID has the same format as the identifiers utilized according to the IEEE 802.11 standard. In addition, in an advantageous way, for a paging signaling the same signaling methods are applied as defined in the IEEE 802.11 standard. With reference to the standard PSM, a signaling could be achieved by setting a bit in a TIM also in case of dormant state. A paging signaling could then similarly be handled as a signaling with reference to existing data packets at the access point.

In order to realize this compatibility, the TIM as described in the IEEE 802.11 specification is separated into two or more sections, wherein one or more sections are used as usual to map the AID with a validity within an access point, whereas the one or more other sections of the TIM are used to map the PID for the whole paging area. The ratios of the number of AIDs and the number of PIDs in general depend on the use cases. Depending on the size of a paging area and number of individual access points, the number of identifications can vary. Since the coverage area of an access point is in general rather small, in case of ordinary use AIDs and PIDs are available at a sufficient number.

Regarding recognition of a paging signaling as easy as possible, a TIM which comprises the mapping of AIDs and PIDs, could be sent with a beacon. At certain intervals, a mobile station in dormant state activates its sending and receiving function according to IEEE 802.11 standard, receives a beacon and processes the TIM. According to its current state, the mobile station checks either the areas for mapped AIDs or PIDs. If the mobile station is in dormant state, and if a bit representing the PID of the mobile station has been set in the TIM, the paging signaling is deemed to be addressed to the corresponding mobile station. By such means, it can in particular be realized that the method according to the invention is backward compatible and its utilization does not lead to any collisions with the known IEEE 802.11 standard. If a mobile station enters the coverage area of an access point which does not support paging signaling, then the mobile station can enter the standard PSM instead of dormant state.

Alternatively to a joint mapping of PIDs and AIDs in the TIM, a new information element provided for paging signaling could be defined which is sent in addition to the TIM with beacons. By doing so, the TIM remains exclusively—as described in the IEEE 802.11 standard—for the mapping of AIDs on the virtual bitmap of the TIM. For the mapping of PIDs, the new information element which is forwarded with beacons in order to convey paging signaling to the mobile stations is utilized.

In an advantageous embodiment of the invention the paging IDs are generated by a control entity, which has control over multiple access points. In general the access points, which serve for the coverage of the whole paging area, are connected to the control entity. One paging area can be associated with several control entities, though, which co-operate in a variety of ways.

The control entity could be implemented in many varying ways. On the one side, it could be envisioned that the control entity is associated with control components in the network, which distributes IP packets to different access points. For example, an implementation of the control entity on the access router would be beneficial. On the other side, the control entity can be localized on an access point which takes over the control of the paging area and with which several other access points of the paging area are associated. Furthermore, other ways of implementing are possible.

Regarding a utilization of the method according to the invention as efficient as possible, the control entity could buffer the IP packets that are destined for a mobile station in dormant state. After the IP packets have arrived at the control entity, this control entity could distribute paging signaling in order to locate the mobile station in dormant state. To this end, the control entity must know the PID of the mobile station and it must be possible to match the MAC address or another comparable unambiguous identifier to the paging ID. In order to do so, already when a mobile station announces that it will enter dormant state and requests a PID, the unambiguous identifier that is transmitted along with the corresponding request could be stored and correlated with the returned PID.

When the control entity generates a paging signaling, such paging requests are forwarded to one or more access points associated with the control entity. These access points set a bit in the TIM corresponding to the PID and send the TIM with the subsequent beacons.

At regular intervals, the mobile station activates the receiving function for a short time and processes a beacon received. If the bit corresponding to the PID of the mobile station is set in the TIM, the mobile station leaves dormant state. After leaving dormant state a complete association process with the access point, as well as further signaling in order to update location data in the network, can take place.

After leaving dormant state and after association with an access point, the data available at the control entity can be forwarded to the mobile station. After reception of all available data packets, the mobile station can be set to the PSM according to the IEEE 802.11 standard. In case the mobile station does not expect any data for a longer period of time, it can re-enter dormant state.

Now, there are several options of how to design and to further develop the teaching of the present invention in an advantageous way. For this purpose, it must be referred to the claims subordinate to claim 1 on the one hand and to the following explanation of a preferred example of an embodiment of the network and the method for configuring a network according to the invention together with the figure on the other hand. In connection with the explanation of the preferred example of an embodiment and the figure, generally preferred designs and further developments of the teaching will also be explained.

DESCRIPTION OF THE PREFERRED EMBODIMENTS

Figure 1:
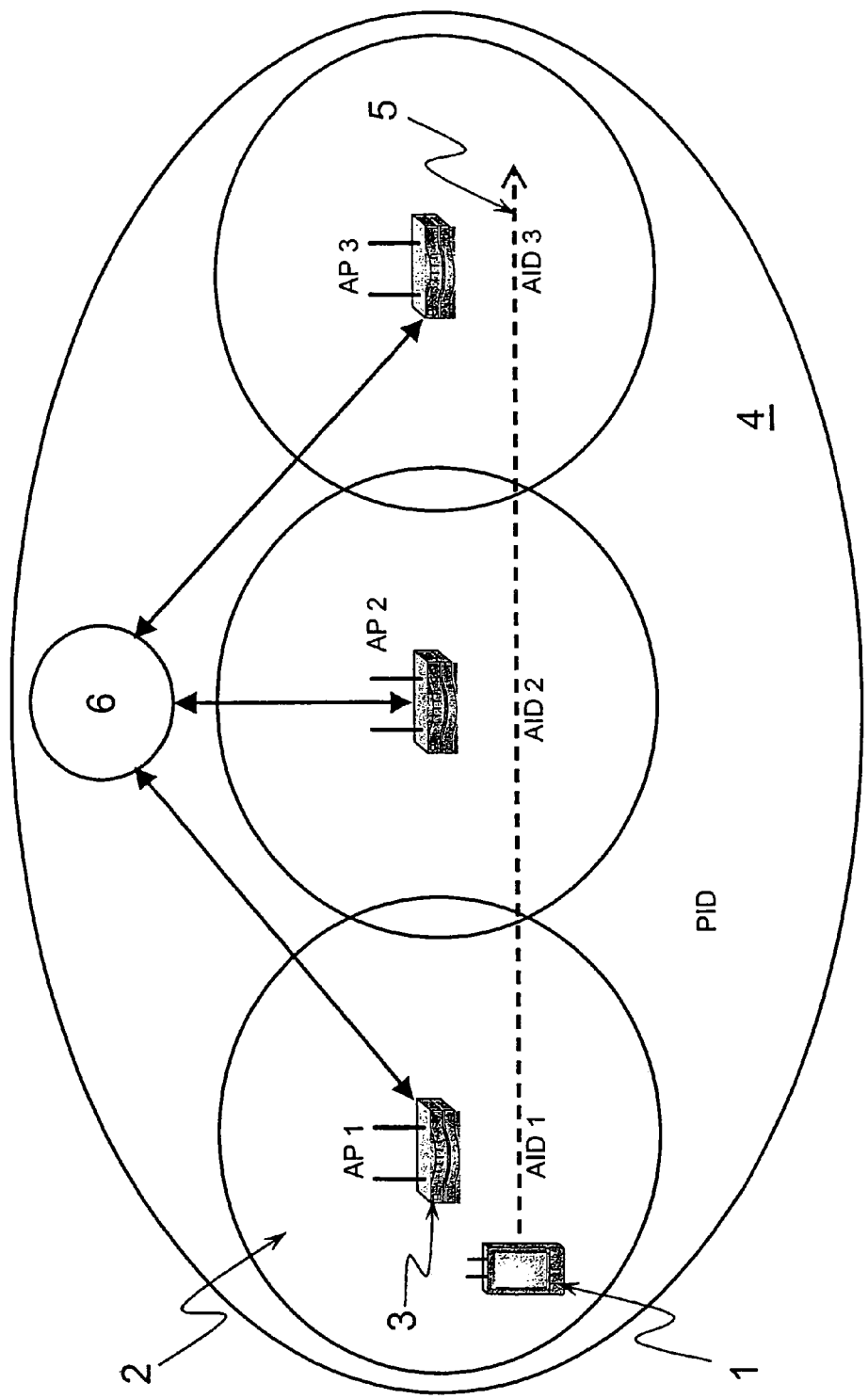
FIG. 1 is a diagram showing a schematic depiction of an example of an embodiment of the method according to the invention for controlling the communication with mobile stations in a network.

FIG. 1 shows in a scheme an example of an embodiment of the method according to the invention. At the beginning of the example scenario, a mobile station 1 is situated within the coverage area 2 of an access point 3—here labelled as AP1—and it is supposed to be localizable after entering dormant state in the paging area 4. The mobile station 1 moves on the path 5 and enters slowly the coverage area of two further access points AP2 or AP3 respectively. Every access point 3 of the paging area 4 is connected to a control entity 6.

In power save mode of the IEEE 802.11, a new association takes place when entering the coverage area of an access point or when changing the coverage areas of access points, and due to this, the mobile station 1 gets a new AID by every access point. By doing so, in PSM and according to the IEEE 802.11 specification, the mobile station would be subsequently assigned the AID 1, AID 2 and AID 3 while moving 5 through the paging area 4. This continuous new association is in particular inefficient if data packets are seldom transmitted to the mobile station and the mobile station transits several coverage areas of an access point before new data packets have to be received.

Hence, the method according to the invention introduces a dormant state which is valid over the coverage area of several access points. Concretely, the dormant state in a defined paging area that comprises the coverage areas of several access points does not have to be left. The size of the paging area depends on different factors, such as for example the number of mobile stations in this area.

Figure 3:
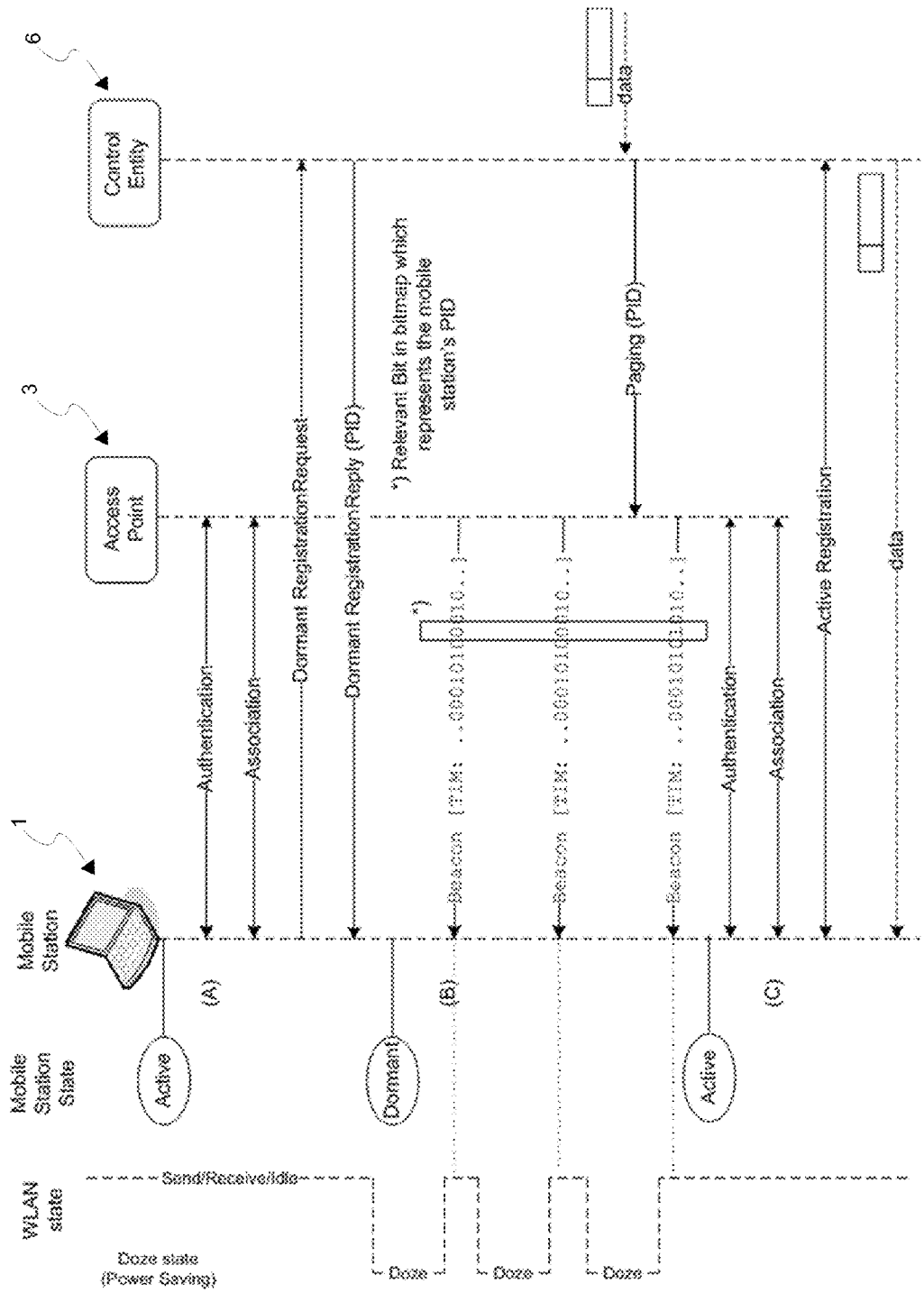
FIG. 3 is a chart illustrating a sequence of signals between an access point, a control entity, and a mobile station corresponding to the power saving states of the mobile station.

If, for example in the coverage area of the access point AP 1, the mobile station 1 wants to enter the dormant state, the mobile station 1 sends a request for a PID over the access point AP 1. The sequence is illustrated in FIG. 3 at (A) as a Dormant Registration Request from the mobile station 1 following the association between the mobile station 1 and the access point 3. The access point 3 forwards this request to the control entity 6 which determines an available PID and transmits it via the access point 3 to the mobile station 1. After that, the mobile station 1 enters the dormant state (indicated by the Dormant indication just above (B)) and leaves this only in case of receiving a paging signaling or in case the resources of the mobile station are needed for a communication initiated by itself, and are hence to be reactivated.

At (B) of FIG. 3, the access point 3 broadcasts beacons wherein a bit is set in the TIM corresponding to the PID. At the mobile station 1, in a manner similar to the PSM of the IEEE 802.11 standard for maintaining backward compatibility, the sending and receiving function of the mobile station is activated at certain intervals illustrated by the WLAN state to receive a paging signaling. Beacons are thus received and processed as described above. The intervals between the activations of the sending and receiving functions can in general be chosen longer than in case of the PSM of the IEEE 802.11 standard.

When data directed to the mobile station 1 arrives at the control entity 6, the control entity distributes paging signaling incorporating the PID of the mobile station 1 to provide an unambiguous identifier, as described above. The identifier corresponding to the PID of the mobile station 1 is sent by the access point 3 incorporated with the TIM of the subsequent beacon. The mobile station 1, still in the dormant state, receives the beacon as a result of having activated the periodic receiving function described above at or around the time of the beacon transmission. Because the beacon includes the bit corresponding to its PID in the TIM, the mobile station leaves the dormant state as indicated by the Active indication below (B).

Upon leaving the dormant state, the mobile station 1 proceeds with an association process with an access point 3 as shown at (C) of FIG. 3, as well as further signaling in order to update location data in the network. After association with an access point 3, the data available at the control entity 6 is forwarded to the mobile station. After reception of all available data packets, the mobile station can be set to the PSM according to the IEEE 802.11 standard.

When leaving the paging area 4, the mobile station should be able to recognize the change to a new paging area, for example by processing a paging area identifier transmitted along with the beacons. In this case, the control entity 6, which is assigned to the paging area 4 that was left due to the change, has to be informed about the change of the paging area.

FIG. 2 depicts once again in principle the separation and mapping of the AIDs available in the section of the virtual bitmap of a TIM. According to IEEE 802.11 specification, 2007 AIDs can be distinguished. These AIDs can be assigned arbitrarily to the associated stations. The mapping of the AIDs is done in the traffic indication Map (TIM) and utilized to indicate to the addressed station the data packets buffered at the access point. This standard—conform utilization is shown in the upper part of FIG. 2.

Figure 2:
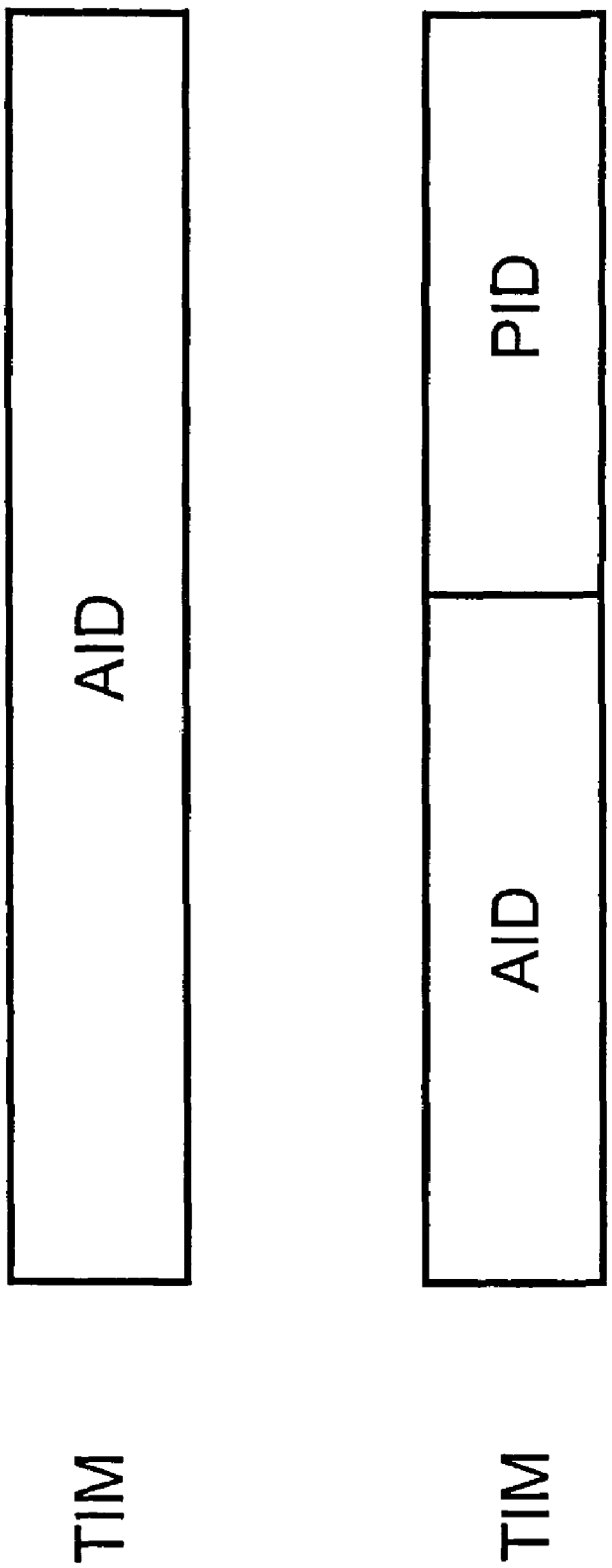
FIG. 2 is a diagram showing the separation of the virtual bitmap of a TIM into two sections in a depiction of the underlying principle.

In the lower part of FIG. 2, an exemplary separation of the available virtual bitmap of the TIM according to the IEEE 802.11 is depicted. One part still fulfills the function for the mapping of AIDs and is used to identify mobile stations from an access point. As with the 802.11 standard, these AIDs are only valid in the coverage area of an individual access point. A further part of the virtual bitmap of the TIM available according to IEEE 802.11 is used to enable the identification beyond several access points and it takes over the function of mapping the PIDs. It should be noted that a separation can be chosen rather arbitrarily and is not subject to any further restrictions. In this sense, for example, a separation in a lower and upper section of the AIDs available according to IEEE 802.11 can happen, as depicted in the lower part of FIG. 2. In particular, both of the sections do not have to show the same number of IDs.

Finally, it is particularly important to point out that the completely arbitrarily chosen examples of an embodiment of the teaching according to the invention from above only serve as illustration of the teaching as according to the invention, but that they do by no means restrict the latter to the given examples of an embodiment.

The invention claimed is:

1. A method for controlling communication in a wireless network including a mobile station and one or more access points through which the mobile station is associated with the network, the mobile station having wireless receiving and transmitting capability and being configured to enter a power save mode, and a dormant state being available in the power save mode, the mobile stations the method comprising:

at the mobile station, requesting a paging identifier (PID) from one of the access points;

at the mobile station, upon receiving the PID responsive to the requesting step, entering a dormant mode, wherein power consumption from a power supply of the mobile station is limited;

at the mobile station and while in the dormant mode, temporarily activating a wireless receiver to receive a wireless beacon signal from an access point of the one or more access points;

at the mobile station and while in the dormant mode, activating the wireless receiving and transmitting capability and, upon receiving the beacon signal, processing the beacon signal to identify a paging signaling corresponding to the PID included in the beacon signal, the PID configured to unambiguously identify the mobile station within a paging area comprising at least the access point of the one or more access points; and upon the mobile station identifying the paging signaling corresponding to the PID unambiguously identifying the mobile station, exiting the dormant mode and entering a full-power active mode, wherein the paging signaling is integrated with the beacon signal, and wherein the paging signaling is generated by setting a bit corresponding to the PID added to a traffic indication map (TIM) of the beacon signal.

2. The method according to claim 1, wherein the mobile station is compatible with a paging standard in accordance with the WLAN.

3. The method according to claim 1, wherein the paging ID is generated by a control entity.

4. The method according to claim 1, wherein the PID has a format identical to identifiers utilized in accordance with the WLAN.

5. The method according to claim 1, wherein the TIM provides information as to packets available for download over the wireless network.

6. The method according to claim 5, wherein the TIM is sent along with subsequent beacons.

7. The method according to claim 1, wherein sections of the TIM are utilized only to map the PIDs.

8. The method according to claim 7, wherein the sections utilized to map the PIDs are associated in an unambiguous way to the TIM.

9. The method according to claim 5, wherein the sections utilized for the mapping of the PIDs are configured by a control entity.

10. The method according to claim 7, wherein the sections utilized for the mapping of the PIDs are configured by a control entity.

11. The method according to claim 1, wherein the paging signaling is generated by setting a bit corresponding to the PID in an information element of the beacon signal.

12. The method according to claim 11, wherein the information element is sent along with subsequent beacons.

13. The method according to claim 1, wherein a plurality of the one or more access points jointly covering the paging area are connected to a control entity.

14. The method according to claim 1, wherein IP packets received by the control entity destined for the mobile station in the dormant state are buffered by the control entity.

15. The method according to claim 1,
wherein the paging signaling is generated by a control entity to locate a mobile station by using the PID of the mobile station, and wherein the paging signaling is forwarded to the one or more access points connected to the control entity.

16. The method according to claim 1, further comprising:
upon the mobile station exiting the dormant state, performing a complete association process with the access point of the one or more access points from which the mobile station received the paging signaling.

17. The method according to claim 16, further comprising:
upon the mobile station completing the association process with the access point of the one or more access points, entering a power save mode.

18. The method according to claim 5, wherein the bit corresponding to the PID is separate from an association identifier (AID) provided with the TIM.

19. A method for controlling communication in a network including a mobile station and an access point through which the mobile station is associated with the network, the mobile station having wireless receiving and transmitting capability and being configured to enter a power save mode, and a dormant state being available in the power save mode, the method comprising:
at the access point, receiving a request for a paging identifier ("PID") from the mobile station, the PID configured to unambiguously identify the mobile station within a paging area comprising at least the access point;

upon receiving the request, generating and broadcasting the PID to the mobile station; and generating and broadcasting a wireless beacon signal including a paging signaling corresponding to the PID, wherein the paging signaling is integrated with the beacon signals, wherein the paging signaling is a bit corresponding to the PID appended to a traffic indication mare (TIM) of the beacon signal.

20. The method according to claim 19, wherein the TIM provides information as to packets available for download over the wireless network.

21. The method according to claim 19, wherein the paging ID is generated by a control entity connected to the access point, and the access point is one of a plurality of access points jointly covering the paging area.

* * * * *